United States Patent [19]

Gellekink

[11] 4,394,659
[45] Jul. 19, 1983

[54] MONOPULSE RADAR WITH PILOT SIGNAL GENERATOR

[75] Inventor: Bernard Gellekink, Ootmarsum, Netherlands

[73] Assignee: Hollandse Signaalapparaten B.V., Hengelo, Netherlands

[21] Appl. No.: 227,097

[22] PCT Filed: Apr. 8, 1980

[86] PCT No.: PCT/NL80/00012
§ 371 Date: Dec. 17, 1980
§ 102(e) Date: Dec. 12, 1980

[87] PCT Pub. No.: WO80/02326
PCT Pub. Date: Oct. 30, 1980

[30] Foreign Application Priority Data
Apr. 17, 1979 [NL] Netherlands .................. 7902974

[51] Int. Cl.³ .................................. G01S 13/44
[52] U.S. Cl. ........................... 343/16 M; 343/17.7
[58] Field of Search ..................... 343/16 M, 17.7

[56] References Cited
U.S. PATENT DOCUMENTS 3,718,927  2/1973  Howard et al. ........... 343/16 M X
3,728,723  4/1973  Gellekink ................. 343/16 M X
3,794,998  2/1974  Pearson, Jr. et al. ....... 343/16 M
3,883,870  5/1975  Kunz ...................... 343/16 M X
3,921,173  11/1975 Thomson ................... 343/16 M
3,950,750  4/1976  Churchill et al. ......... 343/17.7
3,977,000  8/1976  Wagner .................... 343/16 M
4,208,632  6/1980  Sheldon et al. ........... 343/5 FT X

FOREIGN PATENT DOCUMENTS 2004273  8/1971  Fed. Rep. of Germany ... 343/16 M

Primary Examiner—Maynard R. Wilbur
Assistant Examiner—K. R. Kaiser
Attorney, Agent, or Firm—Robert J. Kraus

[57] ABSTRACT

A monopulse radar comprising a pilot signal generator (20) for injecting phase and amplitude-defined pilot signals into the separate receiving channels (6-12, 3, 16-19) to obtain correction signals through the variation in the mutual phase and amplitude relationship between the separate receiving channels for correcting angle error signals derived from target return signals. The pilot signal generator (20) and the transmitter (1) are tunable and a control circuit is incorporated for adapting the pilot signal generator (20) relative to the frequency of the target return signals.

10 Claims, 6 Drawing Figures

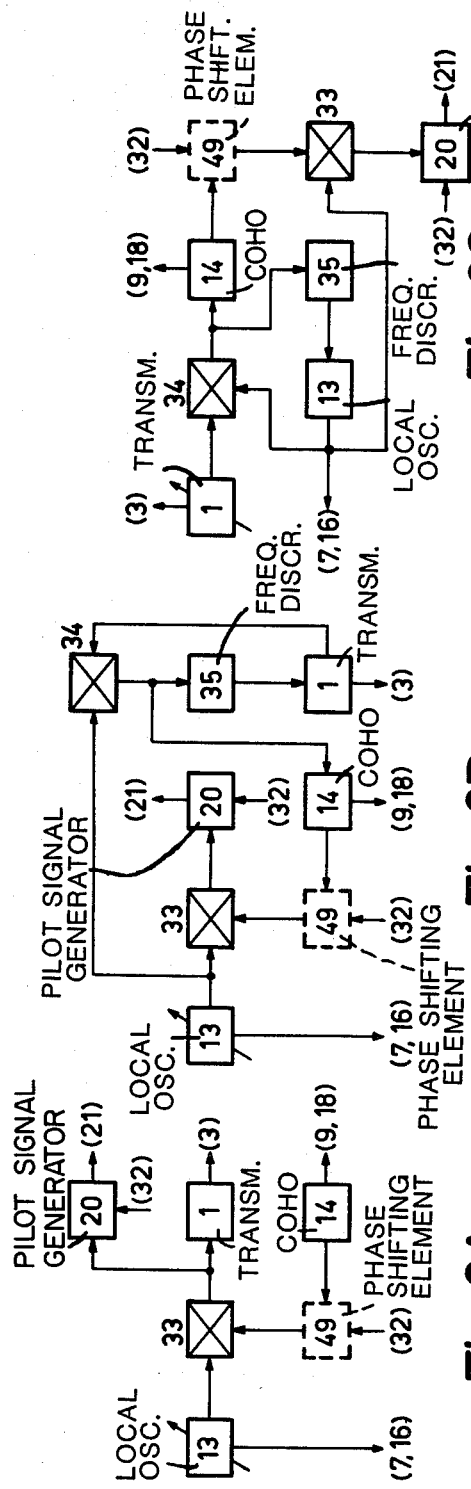
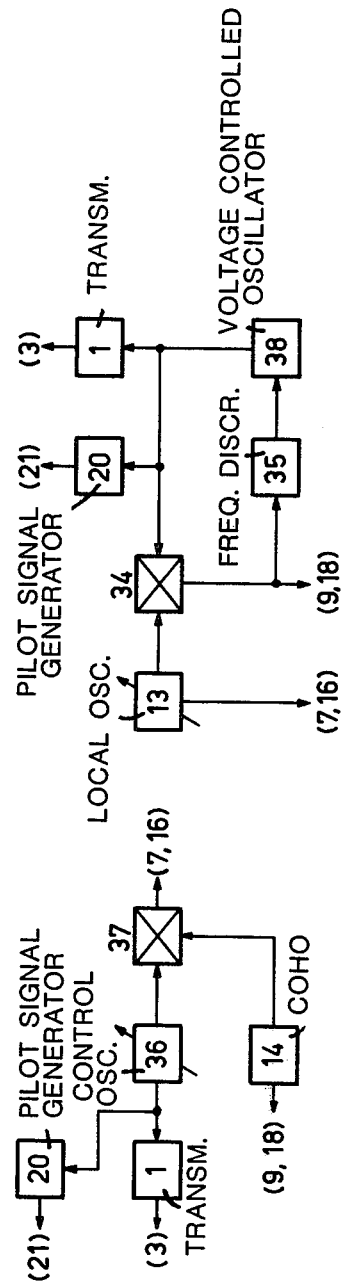

MONOPULSE RADAR WITH PILOT SIGNAL GENERATOR

BACKGROUND OF THE INVENTION

The invention relates to a monopulse radar comprising a pilot signal generator for injecting phase- and amplitude-defined pilot signals into the separate receiving channels to obtain correction signals through the variation in the mutual phase and amplitude relationship between said receiving channels for correcting angle error signals derived from target return signals.

Such a monopulse radar is known from the U.S. Pat. No. 3,794,998; the monopulse radar described therein operates at a fixed transmitter frequency, which limits its effectiveness in the case of unfavorable operating conditions, such as with the receipt of jamming signals and multiple-trace echoes.

SUMMARY OF THE INVENTION

The present invention has for its object to provide a radar apparatus of the type set forth in the opening paragraph, in which radar the above limitation is obviated. According to the invention, the pilot signal generator and the transmitter in the monopulse radar are tunable, while a control circuit is incorporated for adapting the pilot signal generator relative to the frequency of the target returns.

BRIEF DESCRIPTION OF THE DRAWING

The invention will now be described with reference to the accompanying figures, of which FIGS. 2A-E illustrate a number of embodiments of the control circuit for adapting the pilot signal generator relative to the frequency of the target echoes.

DESCRIPTION OF THE PREFERRED EMBODIMENTS

Figure 1:
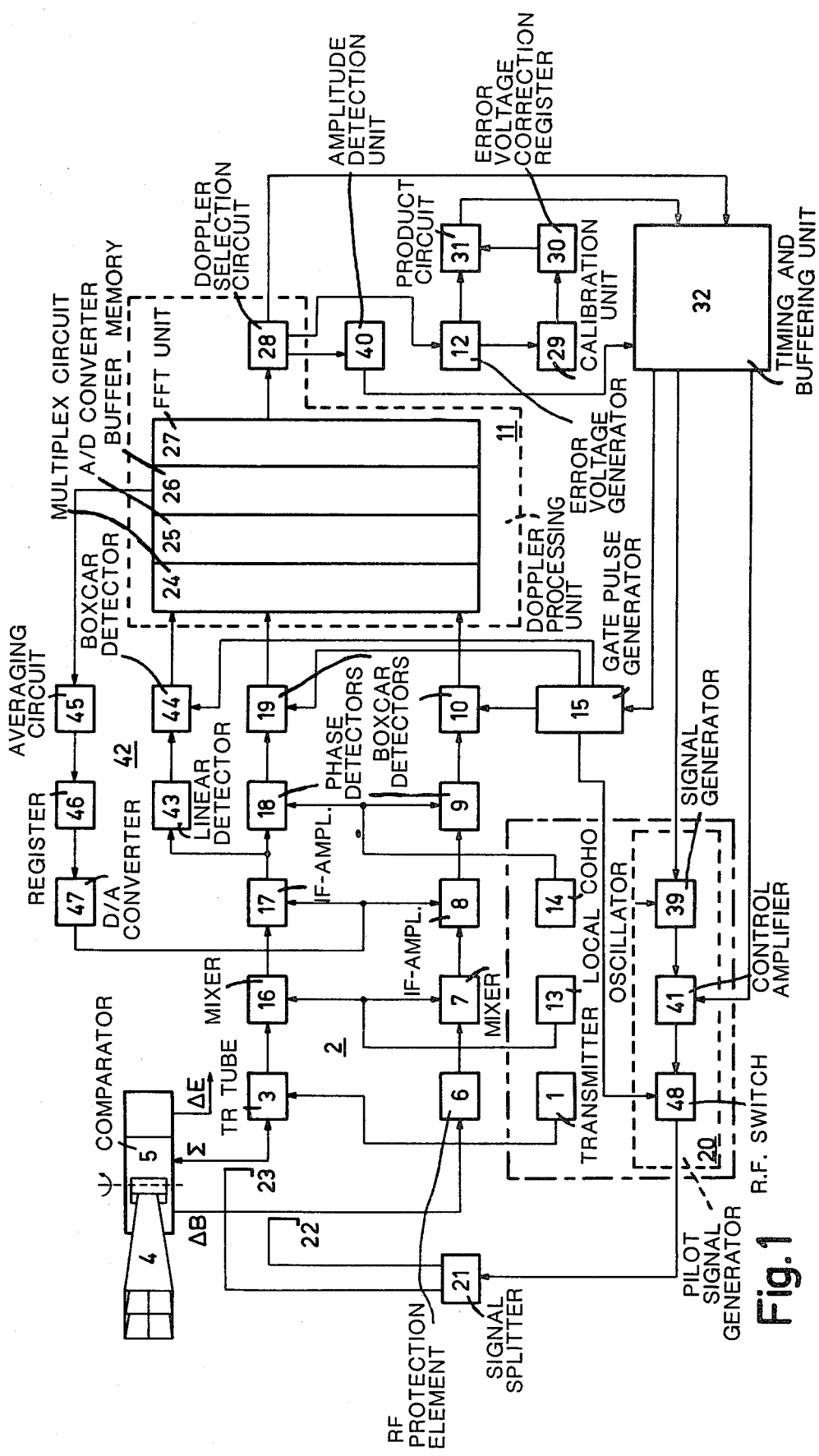
FIG. 1 shows an embodiment of the radar according to the invention.

The radar of FIG. 1 is of the type based on the sum and difference method, permitting the tracking of a moving target in two coordinates and in range. The radar comprises a transmitter 1 and a receiver 2. A TR tube 3 passes transmitter pulses from transmitter 1 to the antenna system 4, where the transmitter pulses are emitted and the associated return signals are detected. As is customary with such a radar, the energy received from a target return is distributed by a comparator 5 to produce an elevation difference signal $\Delta E$, an azimuth difference signal $\Delta B$ and a sum signal $\epsilon$. These signals, containing amplitude and phase information which is a measure of the magnitude and direction of the target deviation with respect to the radar boresight axis, are used for the generation of error voltages for controlling the azimuth angle tracking unit (not shown in the figure) and the elevation angle tracking unit to track the target in azimuth and elevation. The $\Delta B$, $\Delta E$ and $\epsilon$ signals are fed to receiver 2, in which they are processed in separate channels. Apart from the $\epsilon$ channel, FIG. 1 shows only the $\Delta B$ channel, since the $\Delta E$ channel is identical to the latter channel.

The $\Delta B$ channel comprises in succession an RF protection element 6, a mixer 7, an IF amplifier 8, a phase detector 9, a boxcar detector 10, a doppler signal processing unit 11, and an error voltage generator 12. One of the functions of protection element 6 is to protect the $\Delta B$ channel against reflections which are derived from the transmitter signal and are coupled in the $\Delta B$ channel through comparator 5. Using a local oscillator 13, mixer 7 converts the RF signal $\Delta B$ into an IF signal. This IF signal is detected in phase detector 9 by means of an IF oscillator or coherent oscillator (COHO) 14.

Since transmitter 1 consists of a pulsating RF oscillator and is therefore active only during the generation of a transmitter pulse, the phase of the signal derived therefrom is practically randomly distributed with respect to the output signal of local oscillator 13. To meet the consequences thereof, the radar comprises a control circuit of which various embodiments are shown in FIGS. 2A-E. This control circuit, including transmitter 1, local oscillator 13 and COHO 14, achieves a predetermined phase relationship between the transmitter pulse, the local oscillator signal and the COHO signal in each pulse repetition time. In this way the return signal of an ideal fixed target, transformed to the intermediate frequency, retains the same phase relationship with respect to the COHO signal, producing a pulse of constant amplitude after mixing in phase detector 9. For a moving target the above phase relationship and hence the amplitude vary with the doppler frequency shift.

Boxcar detector 10 connected to phase detector 9 has two functions. First, it makes a range selection, that is only the return pulses falling within a range gate determined by a timing unit 15 are passed. Second, it stretches the pulses in such a way that a step signal is obtained at its output.

The $\epsilon$ channel comprises TR tube 3, a mixer 16, an IF amplifier 17, a phase detector 18 and a boxcar detector 19 to process the RF signal $\epsilon$ in the same way as the $\Delta B$ signal. This channel also produces a pulse of constant amplitude for returns from fixed targets, while the amplitude for returns from a moving target varies with the doppler frequency $f_d$. The signal from phase detector 18 is fed to boxcar detector 19, where it is processed as described for the operation of boxcar detector 10. The stepped signals obtained from detectors 10 and 19 are applied to doppler signal processing unit 11, where the stepped signals are filtered. The $\epsilon_D$ and $\Delta B_D$ signals so obtained are fed to error voltage generator 12, which determines the real value of the signal ratio $\Delta B_D/\epsilon_D$, representative of the error voltage for the azimuth tracking unit. However this method, described in U.S. Pat. Nos. 3,467,963 and 3,708,794 has the disadvantage that the signal ratio $\Delta B_D/\epsilon_D$ is strongly influenced by the fact that with the passage of the signals through the two receiving channels the phase and amplitude relationship between these channels is subject to variation. The signal ratio $\Delta B_D/\epsilon_D$ thus determined should therefore be corrected for errors incurred with such a variation. This correction is achieved with a pilot signal generator 20, generating artificial return signals of known phase and amplitude; these return signals are hereinafter called pilot signals. A signal splitter 21 distributes the pilot signals to the receiving channels concerned, while directional couplers 22 and 23 inserted in the RF channels inject the pilot signals into the $\Delta B$ and $\epsilon$ channels, respectively. To exclude unnecessary phase differences in the two RF channels as much as possible, protection element 6 is of the same design as TR tube 3. The pilot signals are also applied to the doppler signal processing unit 11, which in turn delivers the doppler-filtered output signals $\Delta B_a$ and $\epsilon_a$ to the error voltage generator 12. Generator 12 determines the signal ratio $\Delta B_a/\epsilon_a$ for the pilot signal. Since the signal ratio and the phase relationship obtained with the signal splitter 21 are known, the ratio $\Delta B_a/\epsilon_a$ obtained from error voltage generator 12 can be utilised as a correction factor for the signal ratio $\Delta B_D/\epsilon_D$ derived from the target return. The error voltage obtained after correction can be expressed by:

$$\kappa \cdot \frac{\Delta B_D}{\Delta B_a} \cdot \frac{\Sigma_a}{\Sigma_D},$$

where K is a "calibration" constant.

Complications however arise when a corrected error voltage is determined with the application of analogue techniques, since the signal ratios $\Delta B_D/\epsilon_D$ and $\Delta B_a/\epsilon_a$ are not available simultaneously. It is therefore preferable to process the signals digitally in the doppler processing unit 11. With such a process the signal ratio first obtained is stored in a buffer memory, so that it is available as soon as the other signal ratio has been determined.

Time can be saved in determining the signal ratios by using Fast Fourier Transform (FFT) techniques in the digital doppler signal processing unit 11. To do this the doppler signal processing unit 11 comprises successively a multiplex circuit 24, an A/D converter 25, a buffer memory 26 and an FFT unit 27.

Unlike analogue techniques, digital FFT techniques only range selection in boxcar detectors 10 and 19. The target return received within the range gate is stored in detectors 10 and 19 and is transferred, on request, to the doppler signal processing unit 11.

With an N-point Fast Fourier Transformation (of the discrete type), sampled signals of N successive pulse repetition times of the same boxcar detector are required for one result. The result is obtained by the values of the Fourier coefficients, which are produced for each of the N frequency intervals of the doppler filter range $(0; \frac{1}{2}f_r)$, where $f_r$ is the pulse repetition frequency. FFT unit 27 does not start until the N samples have been received; up to this time the samples are stored in separate registers of buffer memory 26. Since in each pulse repetition time two samples, viz. $\Delta b_D$, $\epsilon_D$ and $\Delta b_a$, $\epsilon_a$, must be available for each boxcar detector, buffer memory 26 must have a capacity of 4 N registers. Multiplex circuit 24 distributes the four samples present in each pulse repetition time over the various registers; in each period of N pulse repetition times and in each frequency interval i, where $i = 1, 2, \ldots, N$, four Fourier coefficients, viz. $\Delta B_D^i$, $\epsilon_D^i$, $\Delta B_a^i$ and $\epsilon_a^i$, are produced. The Fourier coefficients for each of the receiving channels, both for return and pilot signals, are determined on a time-sharing basis. A doppler selection circuit 28 in unit 11 selects out of the collection of Fourier coefficients $\epsilon_D^i$ the largest coefficient, denoted by $\epsilon_D^F$. Circuit 28 also selects the remaining three Fourier coefficients belonging to the same frequency interval, viz. $\Delta B_D^F$, $\Delta B_a^F$ and $\epsilon_a^F$. From these four coefficients, which may be of a complex form, the error voltage generator 12 produces two digital values representing the real parts of the signals $$\frac{\Delta B_D^F}{\Sigma_D^F} \text{ and } \frac{\Delta B_a^F}{\Sigma_a^F} \text{ denoted by } Re\left(\frac{\Delta B_D^F}{\Sigma F_D^F}\right) \text{ and}$$

-continued $$Re\left(\frac{\Delta B_a^F}{\Sigma_a^F}\right).$$

Factor $$Re\left(\frac{\Delta B_a^F}{\Sigma_a^F}\right)$$

is a measure for the variation in the mutual phase and amplitude relationship between the $\Delta B$ and the $\epsilon$ channels and is suitable to correct factor $$Re\left(\frac{\Delta B_D^F}{\Sigma F_D^F}\right)$$

for this variation. The radar further comprises a calibration unit 29, which multiplies factor $$Re\left(\frac{\Delta B_a^F}{\Sigma_a^F}\right)$$

by the calibration constant K. The error voltage correction factor so obtained is stored in an error voltage correction register 30. A product circuit 31 is connected to error voltage generator 12 and register 30 to derive the corrected error voltage $$Re\left(\frac{\Delta B_D^F}{\Sigma_D^F}\right) / \kappa \cdot Re\left(\frac{\Delta B_a^F}{\Sigma_D^F}\right)$$

from the factors $$Re\left(\frac{\Delta B_D^F}{\Sigma_D^F}\right) \text{ and } \kappa \cdot Re\left(\frac{\Delta B_a^F}{\Sigma_D^F}\right).$$

The corrected error voltage is supplied to a timing and buffering unit 32.

A number of embodiments of the control circuit, used to obtain the desired phase relationship between the transmitter pulse, the local oscillator signal and the COHO signal, will now be discussed with reference to FIGS. 2A-E.

The control circuit of FIG. 2A comprises a mixer 33, which receives both the local oscillator signal and the COHO signal. In this embodiment the local oscillator 13 is an oscillator tunable in steps and COHO 14 is a fixed oscillator. The frequency of the output signal of mixer 33 equals the sum of the frequencies of the applied signals. The mixer output signal is fed to transmitter 1 and pilot signal generator 20, where transmitter 1 functions as a power amplifier.

In FIG. 2B the control circuit comprises a (first) mixer 33, fed with both the output signal of local oscillator 13 and the output signals of COHO 14. In this embodiment the local oscillator 13 functions as an oscillator tunable in steps and COHO 14 as a voltage controlled oscillator. The control circuit further comprises a second mixer 34, fed with the output signal of tunable transmitter 1 and that of the local oscillator 13, and a frequency discriminator 35 connected to mixer 34. Frequency discriminator 35 delivers an error voltage, whose magnitude is determined by the frequency difference of the signals applied to mixer 34. The error voltage is used to correct the transmitter frequency for a value showing a fixed difference with the local oscillator frequency. The output signal of mixer 34 is further utilised for the phase control of COHO 14 to obtain the required phase relationship between transmitter 1, local oscillator 13 and COHO 14. The output signal of the first mixer 33 is also used as a control signal for the pilot signal generator 20.

The control circuit of FIG. 2C comprises a first mixer 33, a second mixer 34 and a discriminator 35 connected to mixer 34. Transmitter 1 and local oscillator 13 are of the tunable oscillator type. The signals from transmitter 1 and from local oscillator 13 are fed to mixer 34, which supplies the frequency discriminator 35 with a signal based on the difference frequency. On receiving this signal the frequency discriminator 35 generates the error voltage to correct the local oscillator 13 for a value showing a fixed difference with the transmitter frequency. The output signal of mixer 34 is further utilised for the phase control of COHO 14. The output signal from mixer 33, fed with the output signals of local oscillator 13 and COHO 14, is used as a control signal for the pilot signal generator 20.

The control circuit of FIG. 2D comprises a tunable control oscillator 36 and a mixer 37. In this embodiment transmitter 1 is of the tunable type. On the recepit of the output signals from COHO 14 and control oscillator 36, mixer 37 produces a signal, based on the difference frequency, for the transformation of the return signals to the intermediate frequency range; mixer 37 thus takes over the function of local oscillator 13. The signal from control oscillator 36 controls both the transmitter 1 and the pilot signal generator 20.

The control circuit of FIG. 2E comprises a mixer 34, a frequency discriminator 35 and a voltage controlled oscillator 38. In this embodiment the local oscillator 13 is of the tunable type. The output signal from mixer 34, connected to local oscillator 13 and the voltage controlled oscillator 38, is fed to a frequency discriminator 35, which in turn generates an error voltage for the control of oscillator 38. The output signal of oscillator 38 controls the setting of pilot signal generator 20 and of transmitter 1 which functions as a power amplifier. Mixer 34 then takes over the function of COHO 14.

It is desirable to determine the correction factor stored in error voltage correction register 30 (FIG. 1) not for the transmitter frequency, but for the target return frequency, that is for the transmitter frequency corrected for the doppler frequency $f_d$. Information about the selected doppler frequency interval is thereto sent from the doppler selection circuit 28 to the pilot signal generator 20 via a timing and buffering unit 32. The information relating to the transmitter frequency from the control circuit and the doppler frequency $f_d$ from unit 32, are combined in a signal generator 39 forming part of the pilot signal generator 20.

The amplitude of the pilot signal is determined by an amplitude detection unit 40, which receives the selected Fourier coefficients $\epsilon_D^F$ and $\epsilon_d^F$. The ratio between these coefficients (amplitude ratio factor), as determined in unit 40, is determinative of the applied gain factor in a control amplifier 41 connected to signal generator 39; the control amplifier 41 is tunable continuously or in steps. The radar receiver further comprises an AGC circuit 42 for determining the gain factor of IF amplifiers 8 and 17. Receiver 2 is provided with a linear detector 43, connected to the output of IF amplifier 17, and with a boxcar detector 44, connected to detector 43 and controlled by timing unit 15. Only the samples of the target returns obtained from boxcar detector 44 are fed to the A/D converter 25 via multiplex circuit 24; the digitised samples are stored in buffer memory 26. An averaging circuit 45 connected to buffer memory 26 determines the average value of the N values obtained from A/D converter 25 and stored in buffer memory 26. From this average value a control factor is derived for IF amplifiers 8 and 17. The control factor is stored in a register 46 and is used to set the gain factor of IF amplifiers 8 and 17 via a D/A converter 47 at any desired moment. Expressing N as a power of 2 with a natural number m as exponent ($N=2^m$), circuit 45 can be represented by a sum circuit for the N values applied, where the output value of circuit 45 is the sum count, deleting the m least significant bits. The digital AGC circuit 42 enables individual tracking of two or more separate targets in the radar beam. For instance, with the presence of two targets in the radar beam, a first AGC factor stored in register 46 is used to set IF amplifiers 8 and 17 optimally during a first period to receive and process the return signal from the nearer target. Subsequently, a second AGC factor stored in register 46 resets IF amplifiers 8 and 17 optimally during a second period in the same pulse repetition time to receive and process the return signal from the more distant target. For a brief period thereafter in the same pulse repetition time the IF amplifiers 8 and 17 set back to the first AGC factor will supply a new sample of a pilot signal which is passed through boxcar detectors 10 and 19 to redetermine the error voltage correction factor for the tracking of the nearer target. Next, the IF amplifiers 8 and 17 are set to the second AGC factor, supplying a new sample of a second pilot signal for passage through the boxcar detectors 10 and 19 to redetermine the error voltage correction factor for the tracking of the more distant target. For each of the two targets the ratio between the respective coefficients $\epsilon_D^F$ and $\epsilon_d^F$ must be determined in unit 40 and supplied to unit 32. With this process, using the FFT unit 27, the AGC circuit 42, the error voltage generator 12, the calibration unit 29, the error voltage correction register 30 and the product circuit 31 the values determined for the target returns from each of the two targets are: an AGC factor, an amplitude ratio factor (for pilot signal generator 20), a separate doppler frequency value (also fed to pilot signal generator 20 via doppler selection circuit 28 and unit 32), and a corrected error voltage. The dimensions of the doppler signal processing unit should be adapted to the increased supply of signals.

The video processing in FFT unit 27 occurs within the doppler filter range $(0;\frac{1}{2}f_r)$, which is divided into N frequency intervals. The clutter components are at the limits of the doppler filter range. It is therefore advisable to avoid the frequency intervals near the limits of the doppler filter range in selecting the frequency interval containing the doppler frequency. With the detection of a target in a moving rain cloud it is possible to determine first the doppler frequency component associated with this cloud and then to exclude the particular frequency interval from the selection of the frequency interval containing the target doppler frequency $f_d$.

In case a doppler frequency component is near one of the limit values of the doppler filter range, implying that this frequency component corresponds with a blind target speed, it is desirable to change the pulse repetition frequency $f_r$ in such a way that the particular doppler frequency component is no longer at the edge of the doppler filter range.

The present invention in all its facets is also applicable in a pulse radar, in which target detection occurs on a quadrature basis to improve the signal/noise figure. Such a pulse radar is described in the cited U.S. Pat. No. 3,794,998; where only amplitude detection, and not doppler detection, of the video signal occurs. In this radar a corrected error voltage is obtained by the steps of:

1. video detection with the COHO output signal applied directly and shifted 90°.
2. separate boxcar detection;
3. signal processing in FFT unit 27; and finally
4. doppler frequency selection.

In such a pulse radar however it may be that, in case of a wrongly selected pulse repetition frequency ($f_r = 2f_d$) and under certain phase conditions, the boxcar detection of the pilot signals is such that from one channel (e.g. the Q channel) a very large sample value is obtained in the majority of N successive pulse repetition times, and from the other channel (i.e. the I channel a very small value. The error voltage correction factor to be calculated then rests essentially on measurements performed on the former channel (i.e. the Q channel), instead of on measurements performed on both channels. To avoid such a disproportionate share of one of the channels in determining the error voltage correction factor, there must be, besides the doppler phase shift, an additional phase difference $\Delta\phi$, where $N\Delta\phi = 360°$, between the detected IF pilot signals in two consecutive pulse repetition times. In this way the video signals will vary in accordance with the additional phase difference $\Delta\phi$, as well as with their doppler phase; consequently, both very small and very large sample values are obtained for both the I and the Q channels over N pulse repetition times. To accomplish this, the embodiments of FIGS. 2A–C can be used to advantage, where the COHO signal is utilised in obtaining the pilot signal. To obtain a practical solution to the above problem concerning the coherent detection of the pilot signals, a timing and buffering unit controlled phase shifting element 49, shifting the COHO signal through a phase of $\Delta\phi$, 2 $\Delta\phi$ etc. in the successive pulse repetition times, can be inserted between COHO 14 and mixer 33.

I claim:

1. A monopulse radar for tracking a target, comprising:
   a. a tunable transmitting means for transmitting RF pulse signals toward the target;
   b. a plurality of receiving channels for producing tracking error signals from target return signals;
   c. a tunable pilot signal generator for injecting pilot signals representative of artifical target return signals into the receiving channels, said pilot signals having predefined phase and amplitude relationships;
   d. means for correcting the tracking error signals in response to differences in the amplification and the phase shifts of the pilot signals injected into the individual receiving channels;
   e. doppler frequency detecting means for detecting a target doppler frequency from the tracking error signals; and
   f. a control circuit electrically-connected to the tunable pilot signal generator, to the tunable transmitting means, and to the doppler frequency detecting means for tuning the pilot signal frequency to the composite value of the transmitting frequency and the doppler frequency.

2. A monopulse radar as in claim 1, wherein the control circuit comprises a tunable oscillator, an IF oscillator, means for responding to signals produced by said oscillators by producing a control signal, and a transmitter pulse oscillator having an input to which said control signal is applied.

3. A monopulse radar as in claim 1, wherein said control circuit comprises a tunable local oscillator, a transmitter pulse oscillator, means for responding to signals produced by said oscillators by producing a difference signal, and a frequency descriminator and an IF oscillator having respective inputs to which said difference signal is applied, said frequency descriminator producing an error signal at an output connected to an input of the transmitter pulse oscillator, said difference signal controlling the phase of the IF oscillator and said error signal correcting the frequency of the transmitter pulse oscillator.

4. A monopulse radar as in claim 1, wherein said control circuit comprises a tunable local oscillator, a tunable transmitter pulse oscillator, means for responding to signals produced by said oscillators to produce a difference signal, a tunable IF oscillator for responding to said difference signal by effecting phase control of the IF oscillator, and a mixer having inputs for receiving signals produced by the local oscillator and the IF oscillator, said mixer producing a signal for controlling the frequency of the tunable pilot signal generator.

5. A monopulse radar as in claim 1, wherein said control circuit comprises a tunable control oscillator, a transmitter pulse oscillator, means for connecting an output from said control oscillator to the transmitter oscillator and the pilot signal generator, an IF oscillator, and a mixer connected to respective outputs of the control oscillator and the IF oscillator for producing an RF signal for application to the receiving channels to effect detection of target return signals.

6. A monopulse radar as in claim 1, wherein said control circuit comprises a control oscillator, a transmitter pulse oscillator, means for connecting an output from said control oscillator to the transmitter oscillator and the pilot signal generator, a tunable local oscillator, means for responding to signals produced by the control oscillator and the local oscillator to produce a difference signal, and a frequency descriminator for producing from said difference signal a control signal for setting the frequency of said control oscillator, said difference signal being applied to the receiving channels to effect phase coherent detection of target return signals.

7. A monopulse radar as in claim 1, characterised in that the doppler frequency detecting means comprises:
   a. means for determining the Fourier frequency coefficient pairs of phase-detected sum and difference signals by the discrete Fourier transform method, which sum and difference signals are obtained from both the target returns and the pilot signals;
   b. a selector circuit for selecting the largest coefficient out of the Fourier frequency coefficients obtained with the sum signal of the target returns and for selecting the remaining frequency coefficients of the same frequency interval;

c. a circuit for determining the real part of the quotient value of the selected coefficient pair for both the target returns and the pilot signals; and d. means for recording the quotient value obtained from the pilot signals and for correcting the quotient value obtained with the return signals to produce a corrected error voltage for correcting the tracking error signals.

8. A monopulse radar as claimed in claim 1, characterised in that the pilot signal generator comprises phase shifting means for incrementing the phase of the doppler-modulated pilot signal in each pulse repetition time to obtain a predefined additional phase increase $\Delta\phi$ between each pair of i.f.-detected pilot signals in consecutive pulse repetition times.

9. A monopulse radar as in claim 8, wherein the pilot signal frequency is derived from a local oscillator signal and an i.f. oscillator signal, characterised in that the phase shifting means imposes the phase increase $\Delta\phi$ on said i.f. oscillator signal.

10. A monopulse radar as claimed in claim 9, characterised in that the phase increase $\Delta\phi$ is determined by the relationship $N.\Delta\phi = 360°$, where N is the number of pilot signals involved in the generation of one single correction signal.

* * * * *